(12) United States Patent
Li

(10) Patent No.: US 9,278,445 B2
(45) Date of Patent: Mar. 8, 2016

(54) DRIVE TOOL DEVICE HAVING CONNECTABLE ARMS

(71) Applicant: Yi Cheng Li, Taichung (TW)

(72) Inventor: Yi Cheng Li, Taichung (TW)

( * ) Notice: Subject to any disclaimer, the term of this patent is extended or adjusted under 35 U.S.C. 154(b) by 244 days.

(21) Appl. No.: 13/927,270

(22) Filed: Jun. 26, 2013

(65) Prior Publication Data

US 2015/0000476 A1    Jan. 1, 2015

(51) Int. Cl.
| | |
|---|---|
| B25G 1/00 | (2006.01) |
| B25B 13/06 | (2006.01) |
| B25B 23/00 | (2006.01) |
| B25B 13/00 | (2006.01) |
| B25B 13/56 | (2006.01) |
| B25G 1/04 | (2006.01) |
| B60B 29/00 | (2006.01) |

(52) U.S. Cl.
CPC ............. *B25G 1/005* (2013.01); *B25B 13/005* (2013.01); *B25B 13/56* (2013.01); *B25G 1/043* (2013.01); *B60B 29/003* (2013.01)

(58) Field of Classification Search
CPC ...... B25G 1/005; B25G 1/043; B25B 13/005; B25B 13/06; B25B 13/48; B25B 23/0007; B25B 23/0035; B25B 13/56; B60B 29/003
USPC .............. 81/124.5, 124.7, 177.2, 177.5
See application file for complete search history.

(56) References Cited

U.S. PATENT DOCUMENTS

| 1,724,491 | A | * | 8/1929 | Mandl | 81/124.6 |
| 5,685,207 | A | * | 11/1997 | Hubert | 81/177.5 |
| D399,716 | S | * | 10/1998 | Carr | D8/21 |
| 6,257,103 | B1 | | 7/2001 | Yu | |
| 6,257,104 | B1 | * | 7/2001 | Jarrett | 81/177.8 |
| 6,260,452 | B1 | | 7/2001 | Yu | |
| 6,598,500 | B1 | * | 7/2003 | Chivington | 81/124.5 |
| 6,692,178 | B2 | | 2/2004 | Yu | |

FOREIGN PATENT DOCUMENTS

DE          3203224 A1 *   8/1983  .............. B25B 13/06

* cited by examiner

*Primary Examiner* — Hadi Shakeri
(74) *Attorney, Agent, or Firm* — Charles E. Baxley

(57) ABSTRACT

A drive tool device includes a drive handle member having three barrels attached to the end portions and the middle portion, the two end barrels each include a non-circular engaging opening communicating with the bore of the handle member, and the drive handle member include one or more non-circular engaging orifices formed in either of the barrels, and a driving shank element includes a non-circular cross section for engaging with the non-circular engaging orifices of the drive handle member and for allowing the drive handle member to be driven by the driving shank element selectively and for allowing the driving shank element to be driven by the drive handle member selectively.

8 Claims, 6 Drawing Sheets

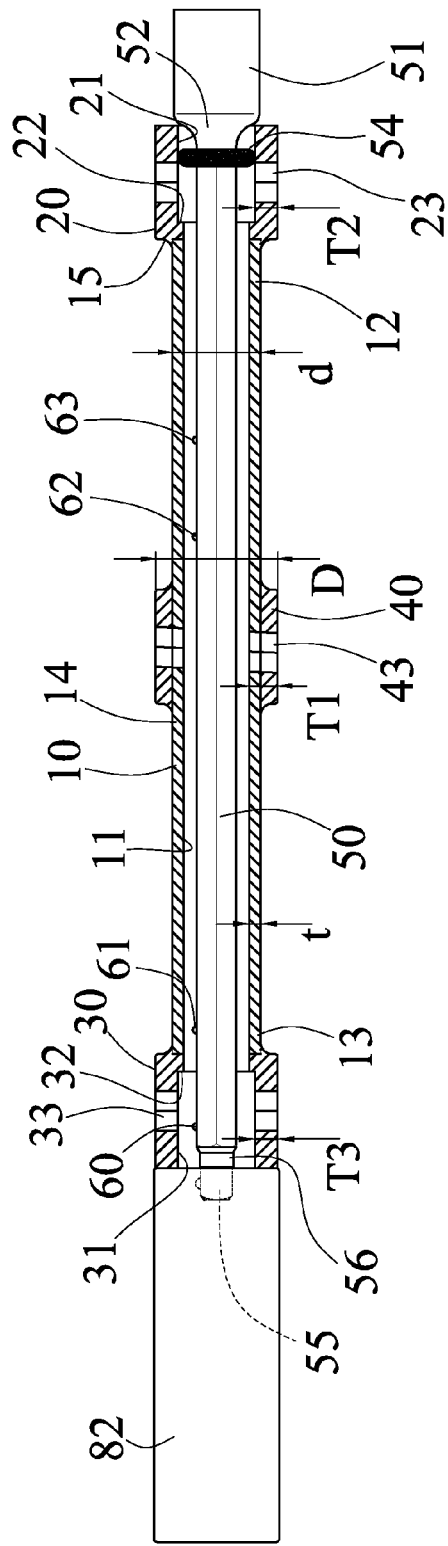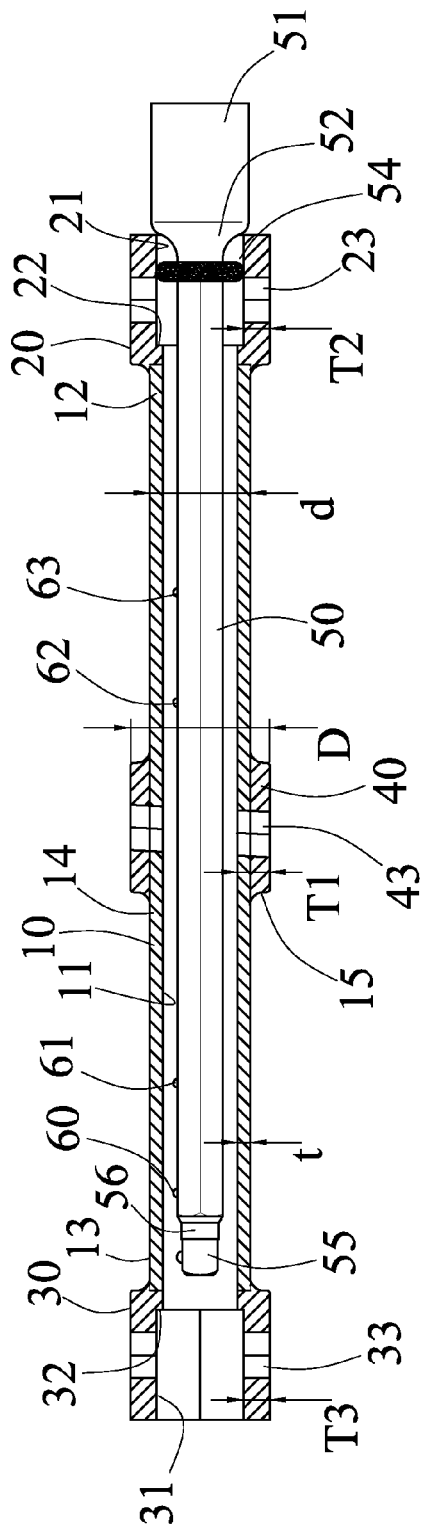

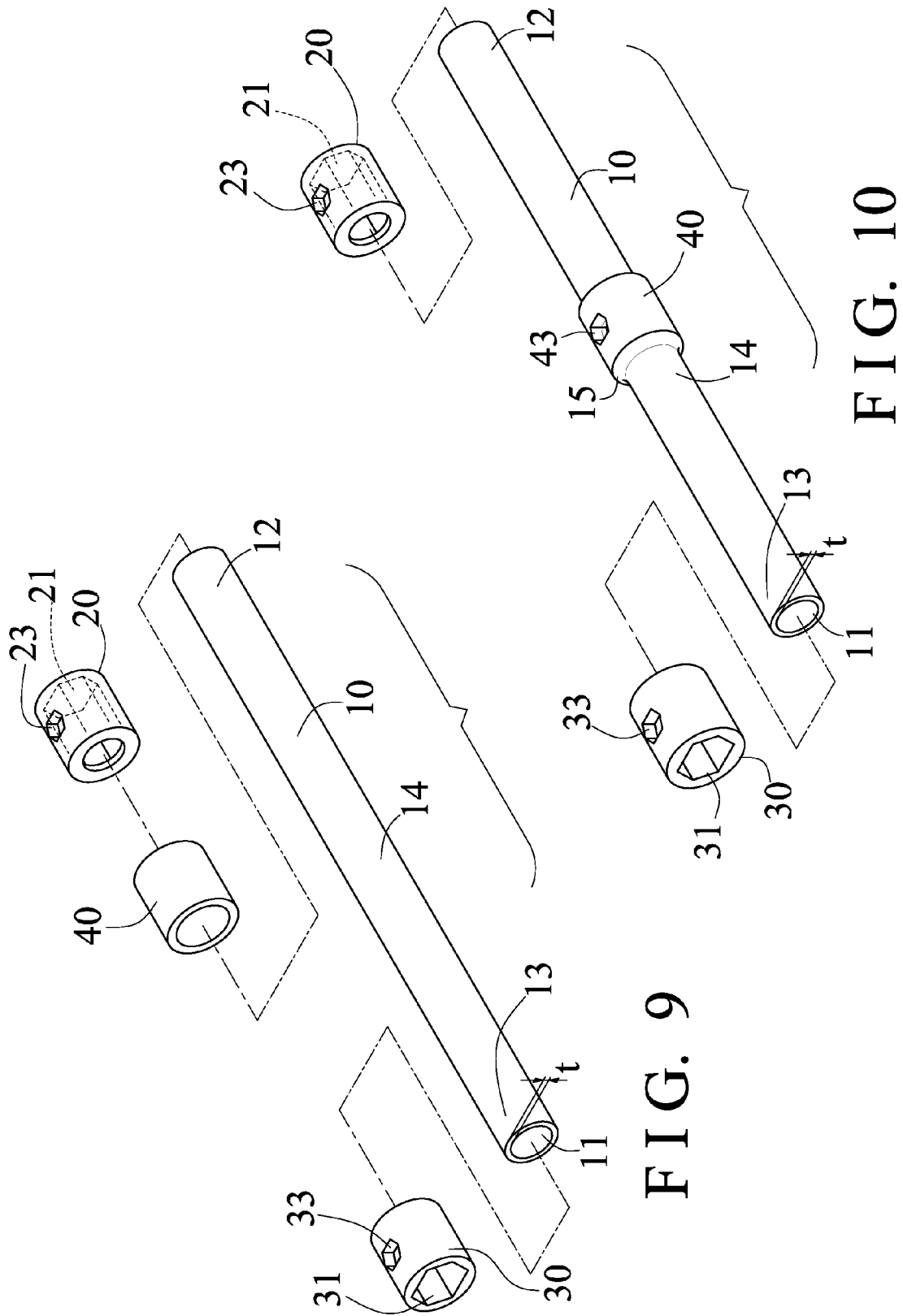

DRIVE TOOL DEVICE HAVING CONNECTABLE ARMS

BACKGROUND OF THE INVENTION

1. Field of the Invention

The present invention relates to a drive tool device, and more particularly to a drive tool device including two levers or arms, such as a drive handle member and a drive shank element engageable or connectable or couplable to different cross connected structure or configuration for allowing the drive tool device to be easily and readily pivoted or rotated relative to the work piece or the like with the drive handle member and/or the drive shank element and for allowing the user to easily and readily conduct various fastener actuating or driving operations.

2. Description of the Prior Art

Typical drive tool devices comprise a drive shank or drive socket or drive member solidly or pivotally attached or mounted or secured to one end of a drive handle for engaging with tool elements or extensions or fasteners and for allowing the tool elements or extensions or fasteners to be actuated or driven or pivoted or rotated relative to the work piece or the like with the drive member of the drive tool devices.

The other conventional tool wrenches for loosening bolts of tires generally includes two arms which are connected with each other in a crossing relationship and each one of two ends of the two arms is connected to a socket so that the user holds one arm to rotate the other arm to loosen bolts. A releasing device is used to interconnect the two arms so that when operating the releasing device, the lock status of the two arms may be released and the two arms can be rotated with other to be a compact size by overlapping one arm onto the other, or to expand the two arms to be a cross shape.

For example, U.S. Pat. No. 6,257,103 to Yu, U.S. Pat. No. 6,260,452 to Yu, and U.S. Pat. No. 6,692,178 to Yu disclose three of the typical drive tool devices each comprising two arms or lever members engageable or connectable or couplable to different cross connected structures or configurations, such as cross-shaped structures or configurations for engaging with and for driving various kinds of driven elements, sockets, tool elements, tool extensions, fasteners, or similar articles.

However, the two arms or lever members include a solid structure or configuration that may greatly increase the weight of the typical drive tool devices and that may not be easily held or grasped or gripped or operated by the user and that may not be effectively pivoted or actuated or driven or rotated relative to the work piece or the like. In addition, the two arms or lever members include a greatly increased volume that is adverse for storing and transportation purposes and that may greatly increase the manufacturing cost of the typical drive tool devices.

The present invention has arisen to mitigate and/or obviate the afore-described disadvantages of the conventional drive tool devices.

SUMMARY OF THE INVENTION

The primary objective of the present invention is to provide a drive tool device including two levers or arms, such as a drive handle member and a drive shank element engageable or connectable or couplable to different cross connected structure or configuration for allowing the drive tool device to be easily and readily pivoted or rotated relative to the work piece or the like with the drive handle member and/or the drive shank element and for allowing the user to easily and readily conduct various fastener actuating or driving operations.

In accordance with one aspect of the invention, there is provided a drive tool device comprising a drive handle member including a bore formed therein and including a first end portion and a second end portion, and including a middle portion, and including a first barrel and a second barrel and a third barrel attached to the first and the second end portions and the middle portion of the drive handle member respectively, the first and the second barrels each including a non-circular engaging opening formed therein and communicating with the bore of the handle member, and the drive handle member including at least one non-circular engaging orifice formed in either of the first or the second or the third barrel, and a driving shank element including a non-circular cross section for engaging with the non-circular engaging orifice of the drive handle member and for allowing the drive handle member to be driven by the driving shank element selectively and for allowing the driving shank element to be driven by the drive handle member selectively.

The first and the second and the third barrels include an outer diameter (D) greater than an outer diameter (d) of the handle member. The engaging openings of the first and the second barrels include an inner diameter greater than that of the bore of the handle member for forming an inner peripheral shoulder between the first and the second barrels and the handle member.

The first and the second and the third barrels include a thicknesses (T1, T2, T3) no less than a thickness (t) of the handle member for increasing the strength of the barrels. The driving shank element includes another barrel or socket attached to one end portion thereof and includes a non-circular engaging opening formed in the socket for selectively engaging with driven members or fasteners.

The driving shank element includes a non-circular engaging stud provided on one end portion thereof for engaging with the other tool elements. The driving shank element includes a retaining ring attached to one end portion of the driving shank element for selectively engaging with the engaging opening of either of the first or the second barrel and for frictionally anchoring the driving shank element to the drive handle member and for preventing the driving shank element from moving or sliding relative to the drive handle member.

The driving shank element includes at least one aperture formed in one end portion of the driving shank element for engaging with a spring-biased projection which may engage with either of the barrels for anchoring or positioning the driving shank element to the drive handle member at the selected position or structure. The driving shank element includes at least one aperture formed in a middle portion of the driving shank element for engaging with a spring-biased projection which may engage with the middle barrel for anchoring or positioning the driving shank element to the drive handle member at the selected position or structure.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 2 is a cross sectional view of the drive tool device;

FIG. 3 is another cross sectional view similar to FIG. 2, illustrating the operation of the drive tool device;

FIG. 9 is a partial exploded view illustrating the formation of the drive tool device; and FIG. 10 is another partial exploded view similar to FIG. 9, illustrating the formation of the drive tool device.

DETAILED DESCRIPTION OF THE PREFERRED EMBODIMENT

Figure 1:
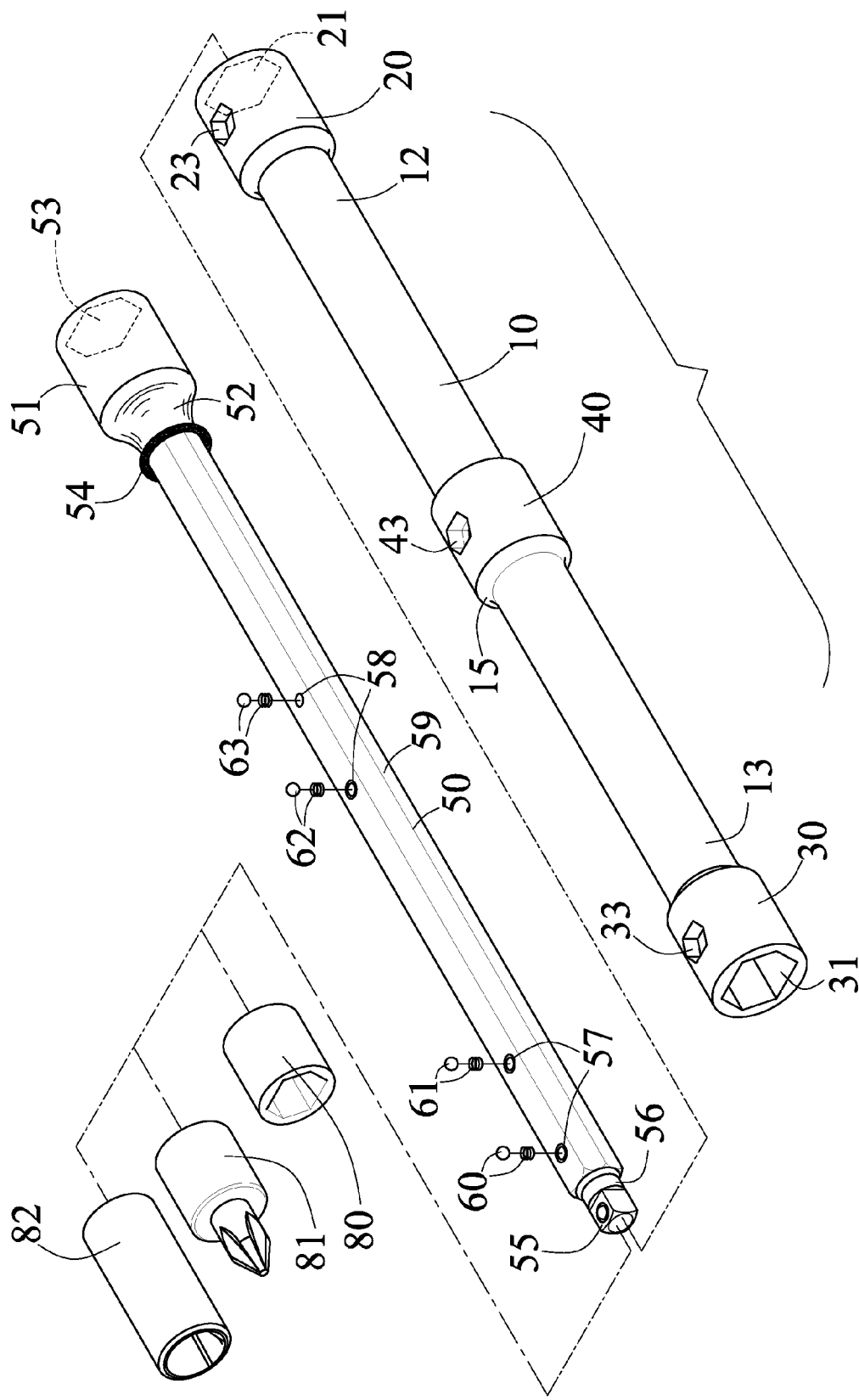
FIG. 1 is a partial exploded view of a drive tool device in accordance with the present invention.

Referring to the drawings, and initially to FIGS. 1-2, a drive tool device in accordance with the present invention comprises an elongated drive shaft or lever or handle member 10 including a chamber or notch or space or compartment or bore 11 formed therein (FIGS. 2-10) and opened through both end portions 12, 13 thereof, such as a first end portion 12 and a second end portion 13, and the handle member 10 includes an intermediate or middle portion 14 formed or provided and located between the two end portions 12, 13 thereof, and includes three sockets or barrels 20, 30, 40 attached or mounted or secured onto the end portions 12, 13 and the middle portion 14 thereof respectively and firmly or solidly and stably welded or secured to the handle member 10 with ultrasonic or welding procedures or the like.

For example, as shown in FIGS. 9 and 10, the first and the second and the third barrels 20, 30, 40 are first made or manufactured as a separating piece from the handle member 10 and then attached or mounted or secured onto the end portions 12, 13 and the middle portion 14 of the handle member 10 respectively and then firmly or solidly and stably welded or secured to the handle member 10 with ultrasonic or welding procedures or the like, and it is preferable that the tilted or inclined or rounded end surfaces 15 (FIGS. 1-5 and 10) are formed or provided between the handle member 10 and the barrels 20, 30, 40 for allowing the handle member 10 of the drive tool device to be smoothly held or grasped or gripped by the user and for preventing the user from being scraped or scrubbed or hurt by the handle member 10 and the barrels 20, 30, 40.

Figure 4:
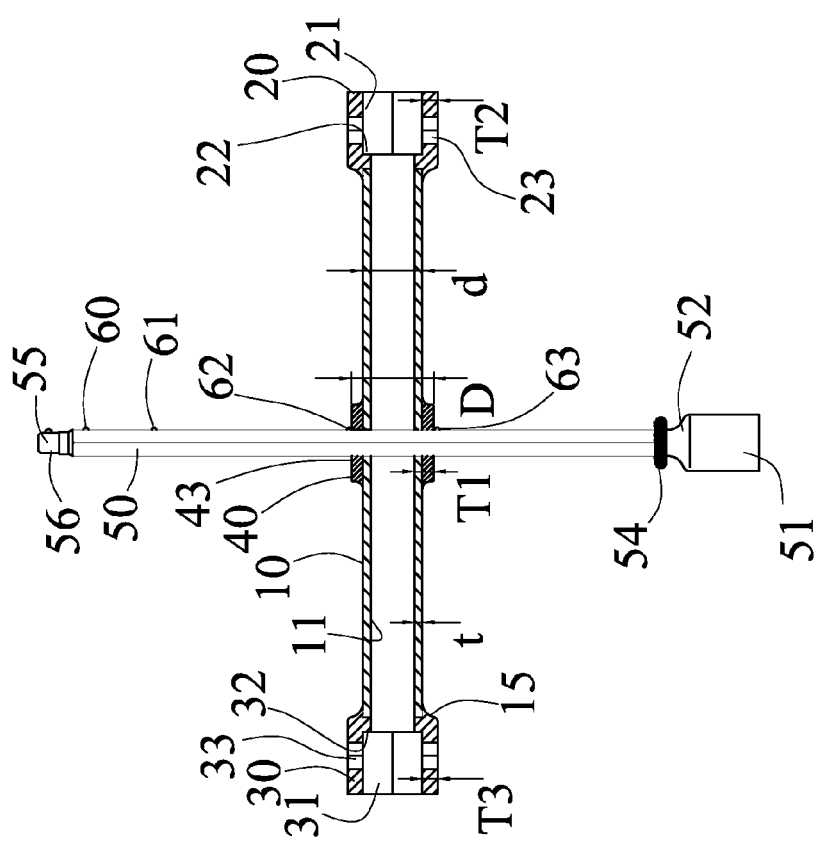

As shown in FIGS. 2-4, it is preferable that the outer diameter (D) of the barrels 20, 30, 40 is greater than the outer diameter (d) of the handle member 10 for suitably increasing the strength of the barrels 20, 30, 40 and/or of the handle member 10 of the drive tool device, the first barrel 20 and the second barrel 30 that are attached or mounted or secured onto the end portions 12, 13 of the handle member 10 respectively each include a non-circular, such as hexagonal engaging opening 21, 31 formed therein and communicating with the bore 11 of the handle member 10, and the engaging openings 21, 31 of the barrels 20, 30 include an inner diameter greater than that of the bore 11 of the handle member 10 for forming or defining a stepped or ladder or inner peripheral shoulder 22, 32 between the barrels 20, 30 and the handle member 10.

It is preferable, but not necessary that the thicknesses (T1, T2, T3) of the barrels 20, 30, 40 are identical or similar to each other, but may be different from each other, and the thicknesses (T1, T2, T3) of the barrels 20, 30, 40 are greater or no less than the thickness (t) of the handle member 10 for suitably increasing the strength of the barrels 20, 30, 40 and/or of the handle member 10 of the drive tool device. The handle member 10 includes one or more (such as three) non-circular, such as hexagonal engaging apertures or orifices 23, 33, 43 formed therein, such as formed in the end portions 12, 13 and the middle portion 14 of the handle member 10 respectively and perpendicular to and intersecting or communicating with the engaging openings 21, 31 of the barrels 20, 30 and/or the bore 11 of the handle member 10, and formed through the barrels 20, 30, 40 respectively.

The drive tool device in accordance with the present invention further comprises an elongated driving shaft or lever or shank element 50 including a corresponding non-circular, such as hexagonal cross section for engaging with the non-circular engaging orifices 23, 33, 43 of the barrels 20, 30, 40 and/or of the drive handle member 10 (FIGS. 4-8) and for guiding and limiting the driving shank element 50 to slide relative to the drive handle member 10 only and for preventing the driving shank element 50 from being pivoted or rotated relative to the drive handle member 10 and for allowing the drive handle member 10 to be pivoted or rotated or driven by the driving shank element 50 selectively, and alternatively, also for allowing the driving shank element 50 to be pivoted or rotated or driven by the drive handle member 10 selectively.

Figure 5:
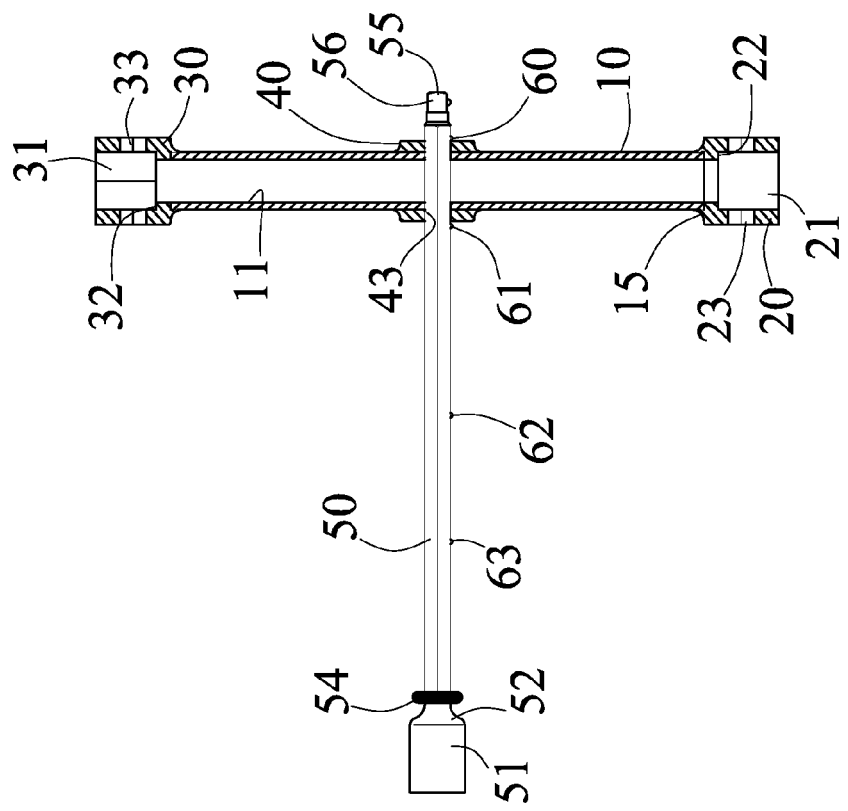
FIGS. 4, 5, 6, 7, 8 are other cross sectional views illustrating the operation of the drive tool device.
Figure 7:
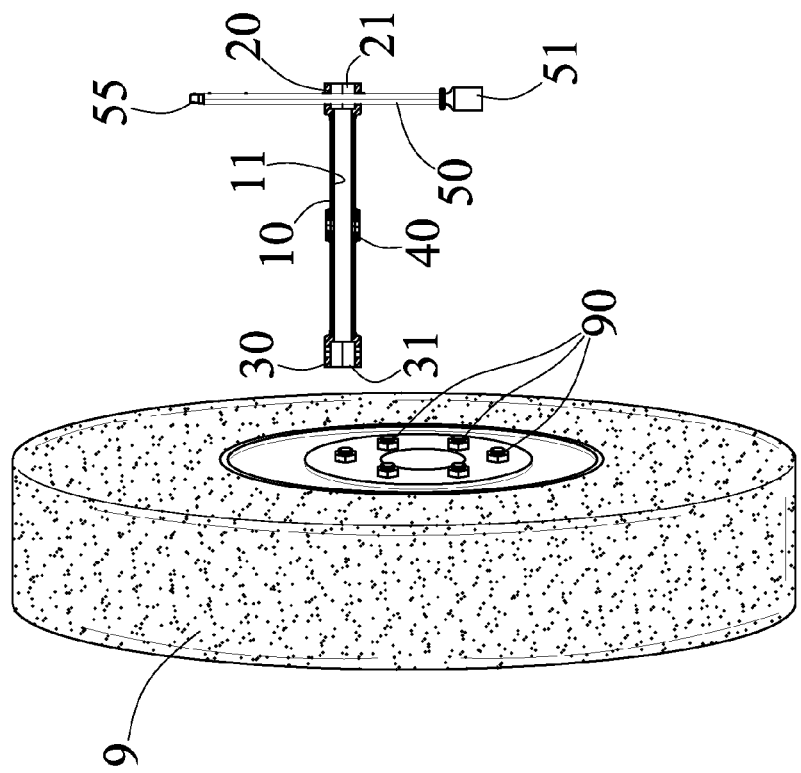
Figure 6:
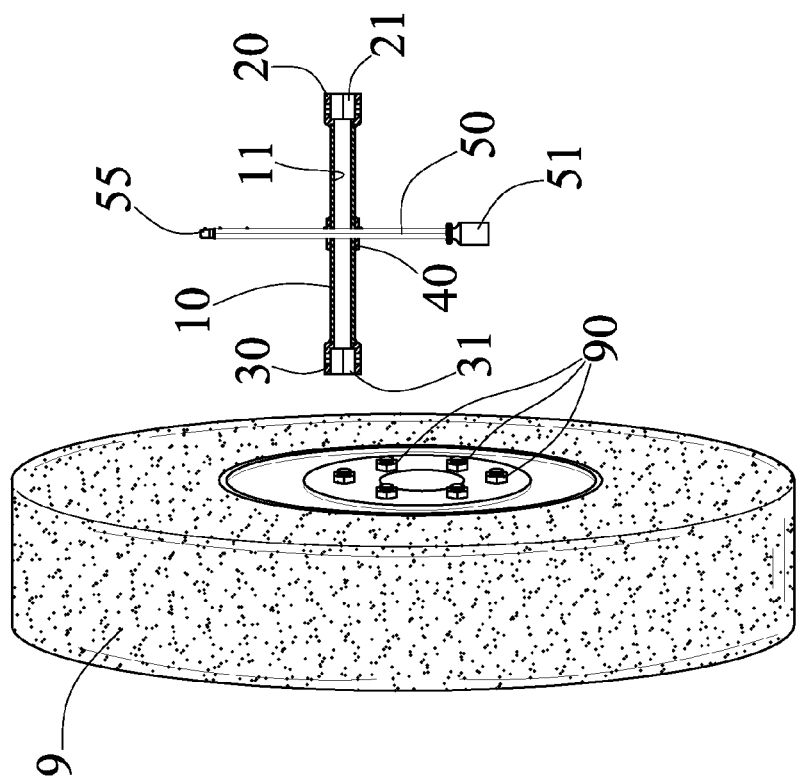
Figure 8:
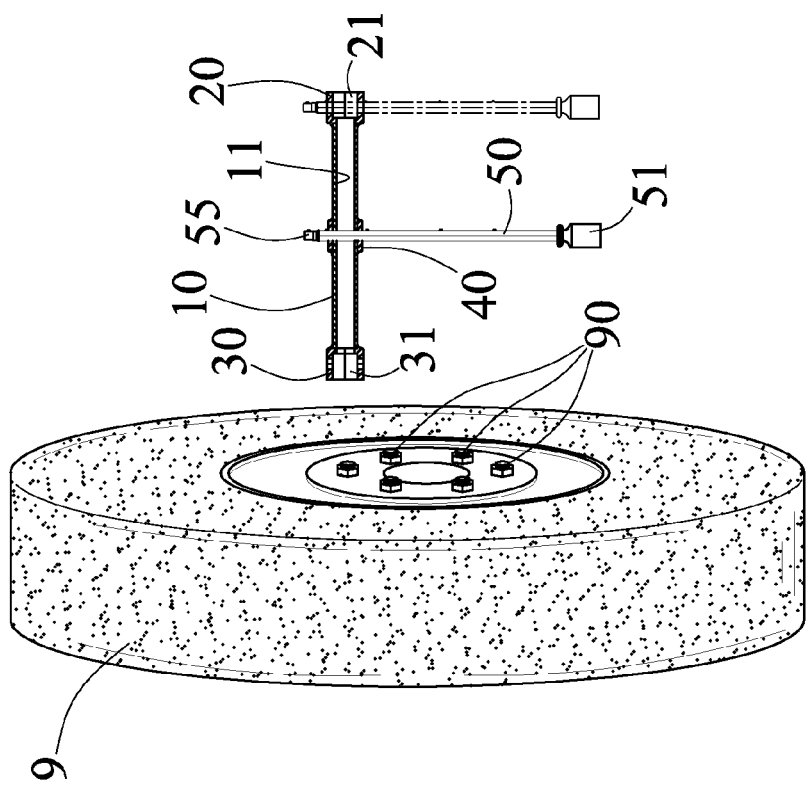

In operation, as shown in FIGS. 6-8, either of the engaging openings 21, 31 of the barrels 20, 30 may be located or faced or directed toward various kinds of driven elements, sockets, tool elements, tool extensions, fasteners 90, or similar articles of the work piece 9 or the like for selectively receiving or engaging with the fastener 90 and for pivoting or rotating or driving the fastener 90 relative to the work piece 9 with the drive handle member 10 and/or the driving shank element 50, in which the driving shank element 50 may be engaged with either of the non-circular engaging orifices 23, 33, 43 of the barrels 20, 30, 40 and/or of the drive handle member 10 for forming or defining a T-shaped (FIGS. 5, 8), L-shaped (as shown in dotted lines in FIG. 8), or cross-shaped (FIGS. 4, 6) structure or configuration for allowing the drive handle member 10 and the driving shank element 50 to be pivoted or rotated or driven by or with each other.

The driving shank element 50 includes another barrel or socket 51 attached or mounted or secured onto the one or first end portion 52 thereof and firmly or solidly and stably welded or secured to the driving shank element 50 with ultrasonic or welding procedures or the like, and includes another non-circular, such as hexagonal engaging opening 53 formed therein for selectively receiving or engaging with the fastener 90 and for pivoting or rotating or driving the fastener 90 relative to the work piece 9 with the driving shank element 50 and/or the drive handle member 10, and includes a gasket or sealing ring or anchoring or retaining ring 54 attached or mounted or secured or engaged onto the one or first end portion 52 of the driving shank element 50 for selectively engaging with or into the engaging openings 21, 31 of the barrels 20, 30 (FIGS. 2-3) and for frictionally engaging with the barrels 20, 30 and for frictionally anchoring or retaining or positioning the driving shank element 50 to the drive handle member 10.

The driving shank element 50 further includes a non-circular, such as quadrilateral or square engaging stud 55 formed or provided in the other end or second end portion 56 thereof for selectively engaging with a driving tool member, such as a socket 80 or a screw driver bit 81 (FIG. 1), or a spark plug 82 (FIGS. 1, 2) which may be selectively pivoted or driven or rotated by or with the driving shank element 50 and/or the drive handle member 10. The driving shank element 50 may further include one or more (such as two) orifices or apertures 57 formed therein, such as formed in the other end or second end portion 56 thereof, and each for receiving or engaging with a ball or detent or stop or spring-biased projection 60, 61 which may be selectively engaged with the barrel 40 of the drive handle member 10 for anchoring or retaining or positioning the driving shank element 50 to the drive handle member 10 at the required position.

For example, as shown in FIGS. 5 and 8, the spring-biased projections 60, 61 of the driving shank element 50 may be selectively engaged with the barrel 20, 30, 40 of the drive handle member 10 for anchoring or retaining or positioning the driving shank element 50 to the drive handle member 10 at the T-shaped (FIGS. 5, 8), or L-shaped (as shown in dotted lines in FIG. 8) structure or configuration. The driving shank element 50 may further include one or more (such as two) apertures or orifices or cavities 58 formed therein, such as formed in the intermediate or middle portion 59 thereof, and each for receiving or engaging with another ball or detent or stop or spring-biased projection 62, 63 which may be selectively engaged with the barrel 20, 30, 40 of the drive handle member 10 for anchoring or retaining or positioning the driving shank element 50 to the drive handle member 10 at the T-shaped (FIG. 7), or cross-shaped (FIGS. 4, 6) structure or configuration.

The engaging openings 21, 31 of the barrels 20, 30 of the drive handle member 10 and the engaging opening 53 of the socket 51 of the driving shank element 50 may be selected from either of the following standards or dimensions, such as 5/16", 3/8", 7/16", 1/2", 9/16", 5/8", 11/16", 3/4", 13/16" . . . or the like, or 8 mm, 9 mm, 10 mm, 11 mm, 12 mm, 13 mm, 14 mm, 15 mm, 16 mm . . . or the like, for selectively receiving or engaging with the fasteners 90 of different standards or dimensions. The handle member 10 includes a hollow structure having the bore 11 formed therein for allowing the weight of the handle member 10 to be greatly decreased and for allowing the handle member 10 to be easily held or grasped or gripped or operated by the user.

The driving shank element 50 may be received or engaged in the bore 11 of the handle member 10 such that the drive tool device in accordance with the present invention may include a greatly decreased volume that is excellent for storing and transportation purposes and that may greatly decrease the manufacturing cost of the drive tool device. The driving shank element 50 may include a length slightly shorter than that of the handle member 10 (FIG. 3), or may include a length slightly greater than that of the handle member 10 (FIG. 2) for allowing the engaging stud 55 of the driving shank element 50 to be extended out of the handle member 10 in order to selectively engage with the driving tool member, such as the socket 80 or the screw driver bit 81 (FIG. 1), or the spark plug 82 (FIGS. 1, 2).

Accordingly, the drive tool device in accordance with the present invention includes two levers or arms, such as a drive handle member and a drive shank element engageable or connectable or couplable to different cross connected structure or configuration for allowing the drive tool device to be easily and readily pivoted or rotated relative to the work piece or the like with the drive handle member and/or the drive shank element and for allowing the user to easily and readily conduct various fastener actuating or driving operations.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A drive tool device comprising:
   a drive handle member including a bore formed therein and including a first end portion and a second end portion, and including a middle portion, and including a first barrel and a second barrel and a third barrel attached to said first and said second end portions and said middle portion of said drive handle member respectively,
   said first and said second barrels each including a non-circular engaging opening formed therein and communicating with said bore of said handle member, and said drive handle member including at least one non-circular engaging orifice formed in either of said first or said second or said third barrel, and
   a driving shank element including a non-circular cross section for engaging with said at least one non-circular engaging orifice of said drive handle member and for allowing said drive handle member to be driven by said driving shank element selectively and for allowing said driving shank element to be driven by said drive handle member selectively, and said driving shank element including a retaining ring attached to one end portion of said driving shank element for selectively engaging with said engaging opening of either of said first or said second barrel and for frictionally anchoring said driving shank element to said drive handle member.

2. The drive tool device as claimed in claim 1, wherein said first and said second and said third barrels include an outer diameter (D) greater than an outer diameter (d) of said handle member.

3. The drive tool device as claimed in claim 1, wherein said engaging openings of said first and said second barrels include an inner diameter greater than that of said bore of said handle member for forming an inner peripheral shoulder between said first and said second barrels and said handle member.

4. The drive tool device as claimed in claim 1, wherein said first and said second and said third barrels include a thicknesses (T1, T2, T3) no less than a thickness (t) of said handle member.

5. The drive tool device as claimed in claim 1, wherein said driving shank element includes a socket attached to one end portion thereof and includes a non-circular engaging opening formed in said socket.

6. The drive tool device as claimed in claim 1, wherein said driving shank element includes a non-circular engaging stud provided on one end portion thereof.

7. The drive tool device as claimed in claim 1, wherein said driving shank element includes at least one aperture formed in one end portion of said driving shank element for engaging with a spring-biased projection.

8. The drive tool device as claimed in claim 1, wherein said driving shank element includes at least one aperture formed in a middle portion of said driving shank element for engaging with a spring-biased projection.

* * * * *